US011015370B2

(12) United States Patent
Mali et al.

(10) Patent No.: US 11,015,370 B2
(45) Date of Patent: May 25, 2021

(54) QUICK-ACTION ORTHOGONAL MOTION CONVERSION MECHANISM WITH DIRECT-ACTING RETURN FEATURE

(71) Applicant: Rockwell Automation Technologies, Inc., Mayfield Heights, OH (US)

(72) Inventors: Girish S. Mali, Nashua, NH (US); Terry Hayward, Milton Keynes (GB); Derek W. Jones, Galloway (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 476 days.

(21) Appl. No.: 15/992,693

(22) Filed: May 30, 2018

(65) Prior Publication Data

US 2019/0368231 A1 Dec. 5, 2019

(51) Int. Cl.
*E05B 63/00* (2006.01)
*E05B 47/06* (2006.01)
*F16P 3/08* (2006.01)

(52) U.S. Cl.
CPC ...... *E05B 63/0069* (2013.01); *E05B 47/0603* (2013.01); *F16P 3/08* (2013.01)

(58) Field of Classification Search
CPC .. E05B 63/0069; E05B 47/0603; E05B 57/00; F16P 3/08; F16P 3/10; Y10T 292/096; Y10T 292/1014; Y10T 292/1022; Y10T 292/1028; Y10T 292/0977; Y10T 292/1016; E05C 3/045; E05C 3/30; E05C 17/14; E05C 19/14
See application file for complete search history.

(56) References Cited

U.S. PATENT DOCUMENTS

| 8,017,880 B2 * | 9/2011 | Eisenhower, Jr. ... H01H 27/002 200/43.04 |
| 2010/0024496 A1 * | 2/2010 | Wolfish ............... E05B 47/0607 70/277 |
| 2011/0259060 A1 * | 10/2011 | Leska ..................... F16P 3/10 70/174 |

* cited by examiner

*Primary Examiner* — Kristina R Fulton
*Assistant Examiner* — Christopher F Callahan
(74) *Attorney, Agent, or Firm* — Amin, Turocy & Watson, LLP

(57) ABSTRACT

An escape release mechanism that serves as a supplementary means for unlocking a solenoid-driven locking switch. The escape release mechanism comprises a knobbed escape release switch that can be pressed by an operator from inside a protected industrial area to override the solenoid-driven lock. In response to a single-direction linear movement of the escape release key, a pin extends from the escape release mechanism in a direction orthogonal to the escape release key's linear movement. This forward movement causes the pin to displace the locking bolt of the locking switch. As the single-direction linear movement of the escape release key continues, the pin retracts from the locking switch out of the path of the locking tongue, allowing the tongue to be removed. In this way, the pin is both extended and retracted in response to a single-direction linear action by the operator.

20 Claims, 5 Drawing Sheets

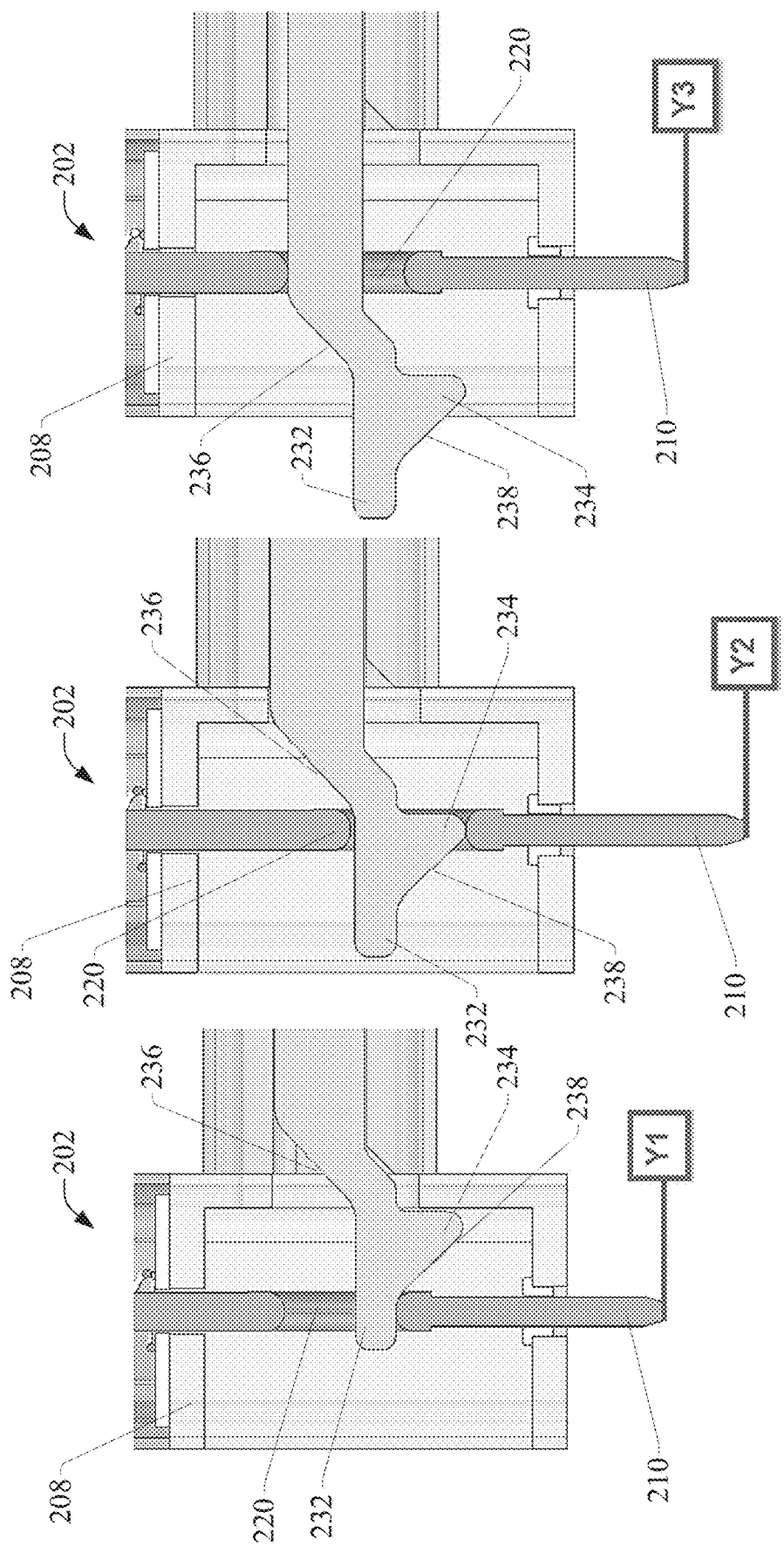

QUICK-ACTION ORTHOGONAL MOTION CONVERSION MECHANISM WITH DIRECT-ACTING RETURN FEATURE

BACKGROUND

The subject matter disclosed herein relates generally to industrial safety locks, and, more particularly, to safety release mechanisms for solenoid-driven industrial safety locks.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, an escape release device is provided, comprising a plunger housed in a plunger housing, wherein a first end of the plunger comprises a pin that protrudes through a hole in a first side of the plunger housing, and a section of the plunger comprises an interactive feature; an escape release key housed within and guided by a key bearing attached to the plunger housing, wherein the key bearing comprises a key shaft that guides a linear motion of the escape release key, and wherein the key bearing positions the escape release key orthogonally to a length of the plunger, wherein a first end of the escape release key comprises a profiled end feature that resides within the plunger housing, and in response to a linear movement of the escape release key into the plunger housing, the profiled end feature interacts with the interactive feature to move the pin in a first direction orthogonal to a direction of the linear movement of the escape release key followed by a second direction opposite the first direction.

An assembly for overriding a solenoid-driven lock comprising an escape release key comprising a profiled end feature, wherein the escape key resides within a key bearing that guides a movement of the escape release key along a first linear path; and a plunger that resides in a plunger housing that guides a movement of the plunger along a second linear path that is substantially orthogonal to the first linear path, the plunger comprising a first end that protrudes through a hole in an end of the plunger housing, and an interactive feature located between the first end and a second end of the plunger opposite the first end, wherein in response to traversal of the escape release key along the first linear path in a direction toward the plunger housing, the profiled end feature interacts with the interactive feature to cause the plunger to move in a first direction along the second linear path until reaching a maximum displacement and to move in a second direction opposite the first direction after reaching the maximum displacement.

Also, an escape release mechanism is provided, comprising a plunger housing; and a pin configured to, in response to movement of an escape release key from a home position to an intermediate position in a direction toward the plunger housing along a first linear path, extend from the plunger housing along a second linear path that is substantially orthogonal to the first linear path, and in response to movement of the escape release key from the intermediate position to an end position in the direction toward the plunger housing along the first linear path, retract toward the plunger housing along the second linear path.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 5A is a cross-sectional side view of an escape release mechanism while in a home position.

FIG. 5B is a cross-sectional side view of an escape release mechanism while in an intermediate position.

FIG. 5C is a cross-sectional side view of an escape release mechanism while in an end position.

DETAILED DESCRIPTION

Figure 1:
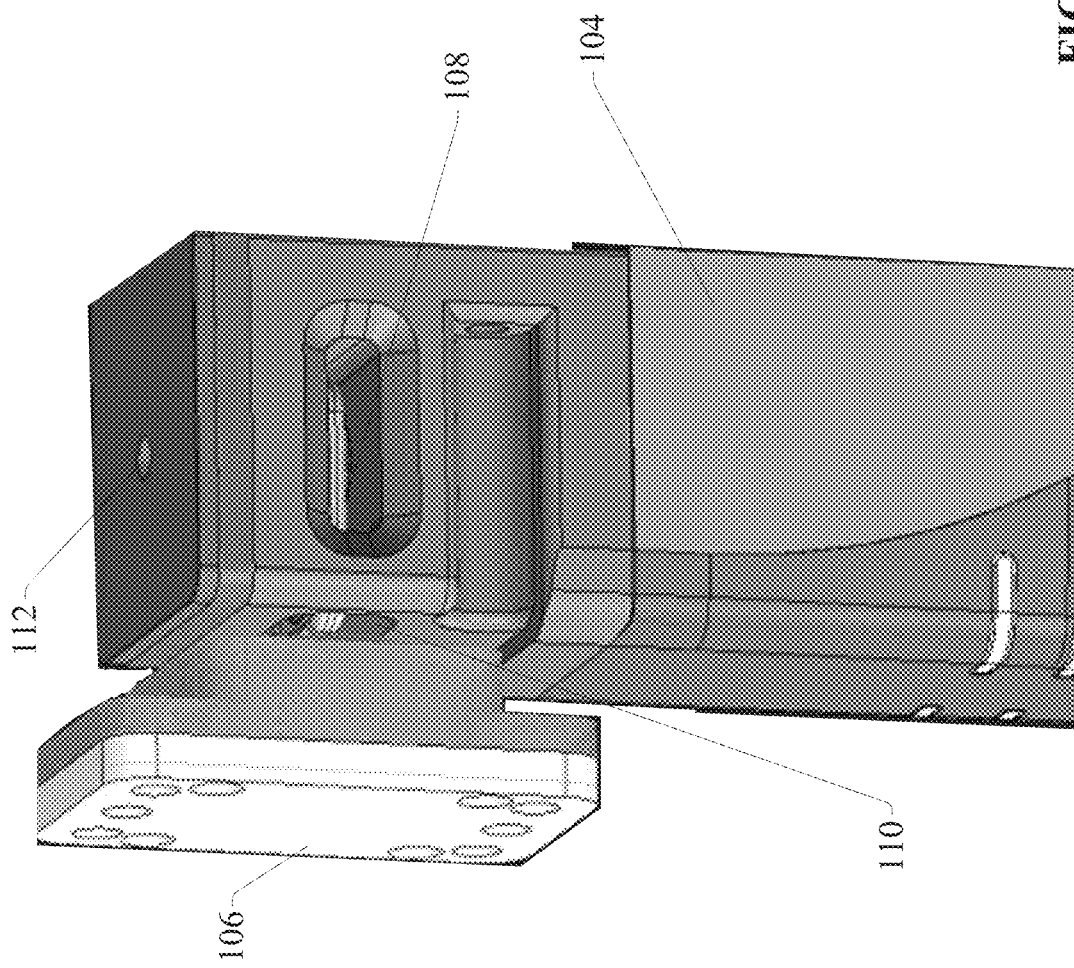
FIG. 1 is a side view of an example locking switch and corresponding locking tongue assembly.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of holes includes one or more holes; etc.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Many industrial machines, robots, or automation systems are protected by safety guarding or fencing that surrounds the hazardous area, forming a protected cell. This safety fencing typically includes a lockable safety gate to allow operator access to the protected area only while the machine or system is not operating and is otherwise in a safe state. Solenoid-driven locking switches are often used to lock these safety gates in the closed position while the protected machine or system is in automatic mode and all associated safety devices are in their safe statuses in order to prevent operator access to the hazardous area while the machine is running.

FIG. 1 is a side view of an example locking switch 104 and corresponding locking tongue assembly 106. The locking switch 104 is typically mounted to either the frame on which the gate is mounted or on the gate itself. The corresponding locking tongue assembly 106 is mounted on the opposite gate component (either on the gate or on the frame) such that a locking tongue 108 mounted on the locking tongue assembly 106 aligns with an entry slot 110 on the locking switch 104. The locking tongue 108 is generally ring-shaped, having a square or circular hole (not shown in FIG. 1) configured to receive and engage with the switch's locking bolt (not shown in FIG. 1).

When the gate is in the closed position, the locking tongue 108 is received in the entry slot 110 of the locking switch 104. While the protected machine or automation system is in automatic mode or is running, the locking switch 104 actuates a solenoid-driven locking bolt upward through the ring of the locking tongue 108, preventing removal of the locking tongue 108 from the locking switch 104 and thereby preventing the gate from being opened. Some locking switches 104 are electrically connected to the machine cell's safety system such that the machine or automation system cannot be placed in automatic mode unless the locking tongue 108 is engaged with the locking switch 104.

In some scenarios, it may be possible for an operator to be locked inside the protected cell if the gate is locked and the machine is placed in automatic mode while the operator is inside the cell. It is therefore necessary to provide a supplemental mechanical means for releasing the locking tongue 108 from the locking switch 104 from inside the protected cell. This supplemental release mechanism would allow an operator who is locked inside the cell to override the electrical locking mechanism of the switch 104 using mechanical means. To ensure reliability of the escape mechanism, the means for overriding the solenoid-driven lock should act directly upon the switch's locking bolt in order to mechanically displace the bolt away from the locking tongue 108. To ensure long-term reliability, the mechanism used to displace the locking bolt should not rely upon springs for its primary motion. Also, this supplemental escape mechanism should be capable of being easily actuated manually by the operator. However, override mechanisms that operate in response to simple operator actions can be difficult to achieve since any mechanism that acts directly on the locking bolt to disengage the bolt from the locking tongue 108 must itself also be removed from the path of the locking tongue 108 before the tongue 108 can be removed from the locking switch 104, necessitating a bi-directional action.

To address these and other issues, one or more embodiments described herein provide an escape release mechanism that serves as a supplementary means for unlocking a solenoid-driven locking switch in response to a single-direction operator action. In one or more embodiments, the escape release mechanism comprises a pin oriented coaxially to the solenoid shaft of the locking switch through which the locking bolt travels. The pin is located at an end of an escape release plunger, which is acted upon by a spring to hold the pin away from the locking bolt while in the home state. A middle section of the plunger comprises an interactive feature such as a square or rectangular ring. An escape release key with an attached escape release push button or knob can be pushed in a linear direction that is orthogonal to the plunger through the interactive feature. As the escape release key is pushed along a forward linear path toward the plunger, the key's profiled end feature interacts with the plunger's interactive feature to cause the plunger to translate through three different positions—an initial (or home) position in which the pin is held away from the locking bolt, a second position in which the pin is driven into the solenoid shaft to push the locking bolt out of the path of the locking tongue, and a third position in which the pin is retracted from the solenoid shaft and out of the path of the locking tongue, allowing the tongue to be removed.

In the example depicted in FIG. 1, locking switch 104 includes an escape release opening 112 that is aligned with the switch's solenoid shaft, above the tip of the switch's locking bolt. The switch's locking bolt can be pushed away from the locking tongue 108 by inserting a pin or other mechanism into the escape release opening 112, thereby disengaging the bolt from the locking tongue 108 and allowing the locking tongue 108 to be removed from the locking switch 104 by opening the door. The escape release mechanism described herein can engage with this escape release opening 112 to override the switch's primary solenoid-driven locking mechanism, as will be described in more detail below.

Figure 2:
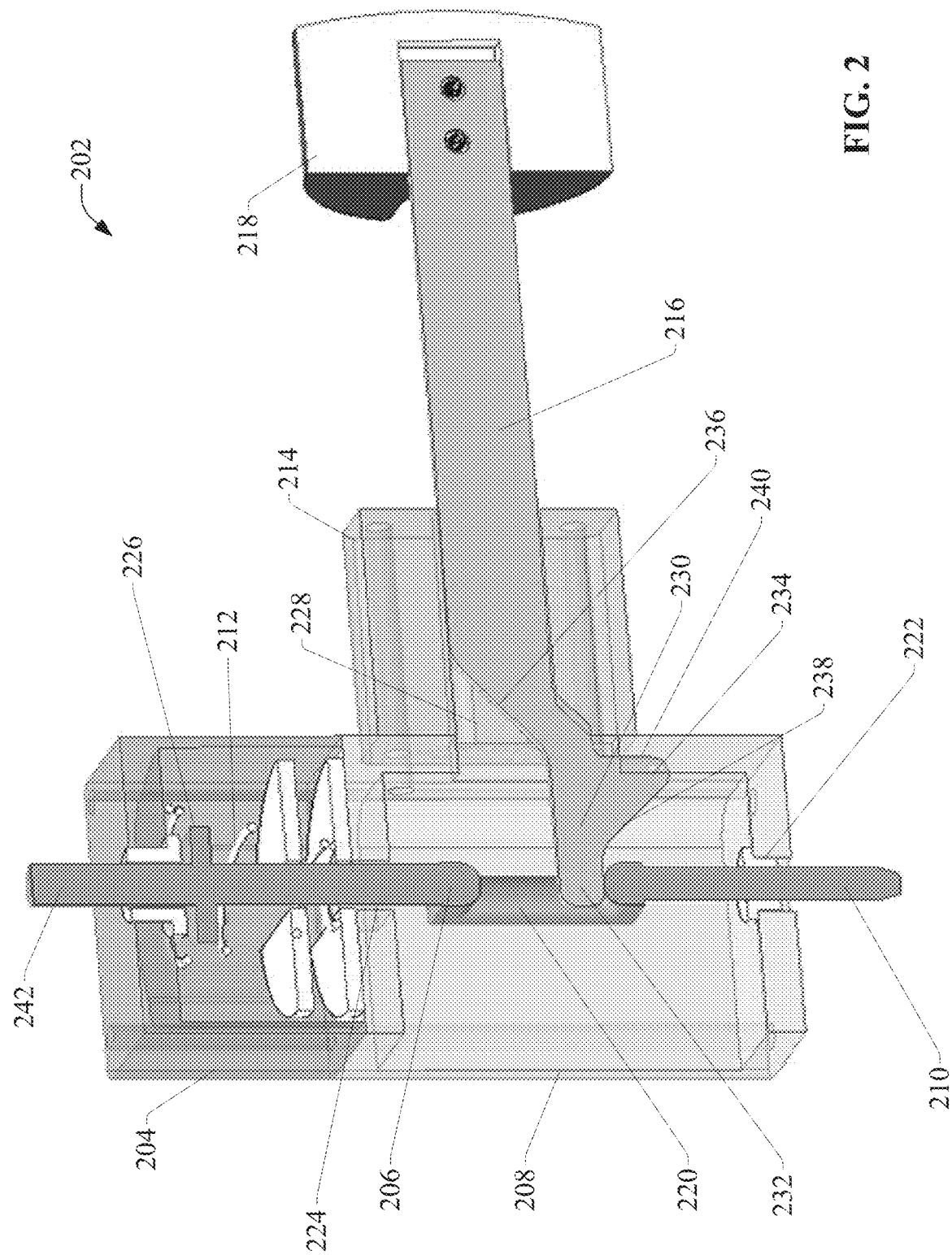
FIG. 2 is a cross-section view of an example escape release mechanism.

FIG. 2 is a cross-section view of an example escape release mechanism 202 according to one or more embodiments. The cross-section view depicted in FIG. 2 provides a view of the interior of the mechanism 202. Escape release mechanism 202 comprises an escape release plunger 206 housed within a plunger housing 208. The lower tip of the plunger protrudes through a hole 222 formed in one end of the plunger housing 208 and serves as a release pin 210 that acts upon the solenoid-driven locking bolt of the locking switch 104. An upper portion of the escape release plunger 206 passes through another hole 224 in the opposite end of the plunger housing 208, and at least partially resides within a spring housing 204 mounted to this end of the plunger housing 208. This upper portion of the escape release plunger 206 has a flat platform 226 formed thereon that is generally orthogonal to the length of the plunger 206. A coil spring 212 resides within the spring housing 204 coaxially with the upper portion of the escape release plunger 206. This spring 212 applies an upward force upon the platform 226, thereby maintaining pressure on the plunger 206 in a direction that retracts the pin 210 toward the plunger housing 208.

A section of the escape release plunger 206 between the plunger's two ends comprises an interactive feature 220. In the example depicted in FIG. 2, the interactive feature 220 is a rectangular or square ring (shown in cross-section in FIG. 2). However, the interactive feature 220 may be another type of opening through the plunger 206 or another type of interactive feature.

An escape release key 216 enters the plunger housing 208 via a key bearing 214 mounted to a side of the plunger housing 208. Key bearing 214 comprises a key shaft 228 having dimensions designed to accommodate the escape release key 216 such that the key 216 can slide linearly through the key shaft in a direction orthogonal to the direction of travel of the plunger 206. The length of the plunger 206 is substantially orthogonal to the length of the escape release key 216. A front section 230 of the escape release key 216 comprising a profiled end feature resides within the plunger housing 208.

The end of the key 216 opposite the profiled front section 230 extends beyond the key bearing 214, and an escape release knob 218 is mounted to this end of the key 216. In an example installation, the escape release mechanism 202 can be installed on a safety gate such that the key bearing 214 and knob 218 face inside the protected cell, allowing an operator inside the cell to actuate the escape release key 216 by pressing the knob 218. Pressing the knob 218 causes the escape release key 216 to move linearly through the key bearing 214 along a linear path that is orthogonal to the linear direction of travel of the escape release plunger 206.

The front section 230 of the escape release key 216 comprises a front protrusion 232 and a lower protrusion 234. The top surface of the escape release key 216 includes an upper sloped section 236 that creates a downwardly sloping transition from the top surface of the main shaft of the key 216 to the top surface of the front protrusion 232. The lower surface of the front protrusion 232 comprises a lower sloped section 238 that creates a downwardly sloping transition from the front protrusion 232 to the lower protrusion 234. This lower sloped section 238 acts as the front edge of the lower protrusion 234, while the rear edge 240 of the lower protrusion 234 is substantially perpendicular to the length of the key 216.

In the home position, depicted in FIG. 2, escape release key 216 is retracted in a direction away from the plunger 206. The escape release mechanism 202 is placed in the home state by pulling on knob 218 until the lower protrusion 234 of the front section 230 (that is, the rear edge 240 of the lower protrusion 234) meets an inside wall of the plunger housing 208 (or another stopping mechanism) below the key bearing 214, preventing further retraction of the key 216. While in this home position, the front protrusion 232 of the front section 230 of the key 216 rests within the interactive feature 220 (e.g., a rectangular or square ring) that makes up the middle section of the plunger 206. The upward force applied to the plunger 206 by the spring 212 while in the home position causes the interactive feature 220 to be raised such that the bottom of the interactive feature 220 touches, or nearly touches, the front protrusion 232.

Figure 3:
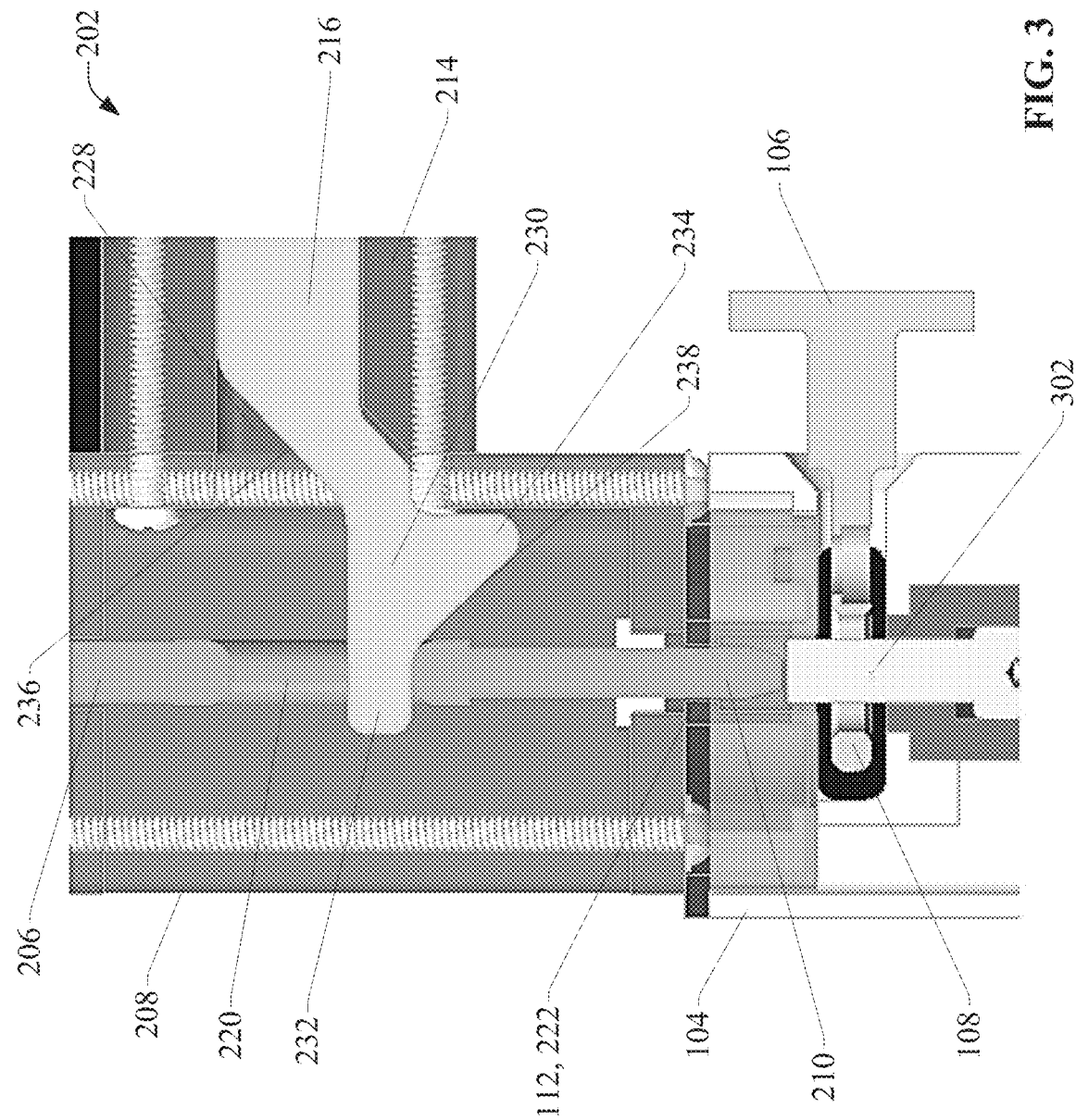
FIG. 3 is a cross-sectional side view of an escape release mechanism mounted to a locking switch.

FIG. 3 is a cross-sectional side view of the escape release mechanism 202 mounted to locking switch 104. Escape release mechanism is mounted to locking switch 104 so that the hole 222 on the bottom of the plunger housing 208 is aligned with the escape release opening 112 on the top of locking switch 104. This positions the escape release plunger 206 to be coaxial with the solenoid-driven locking bolt 302 of the locking switch 104. In the state depicted in FIG. 3, locking switch 104 is in the locked position, with the solenoid-driven locking bolt 302 extended through the locking tongue 108 of locking tongue assembly 106.

Similar to FIG. 2, FIG. 3 depicts the escape release mechanism 202 in the home position. In this position, pin 210 applies little or no pressure on the locking bolt 302 of the locking switch 104, since the spring 212 (not shown in FIG. 3) applies a force on the plunger 206 in the direction away from the locking bolt 302. If an operator becomes locked inside a protected cell and wishes to override the locking switch's solenoid-driven lock, the operator can press forward on the knob 218, driving the escape release key forward through the key bearing 214.

Figure 4:
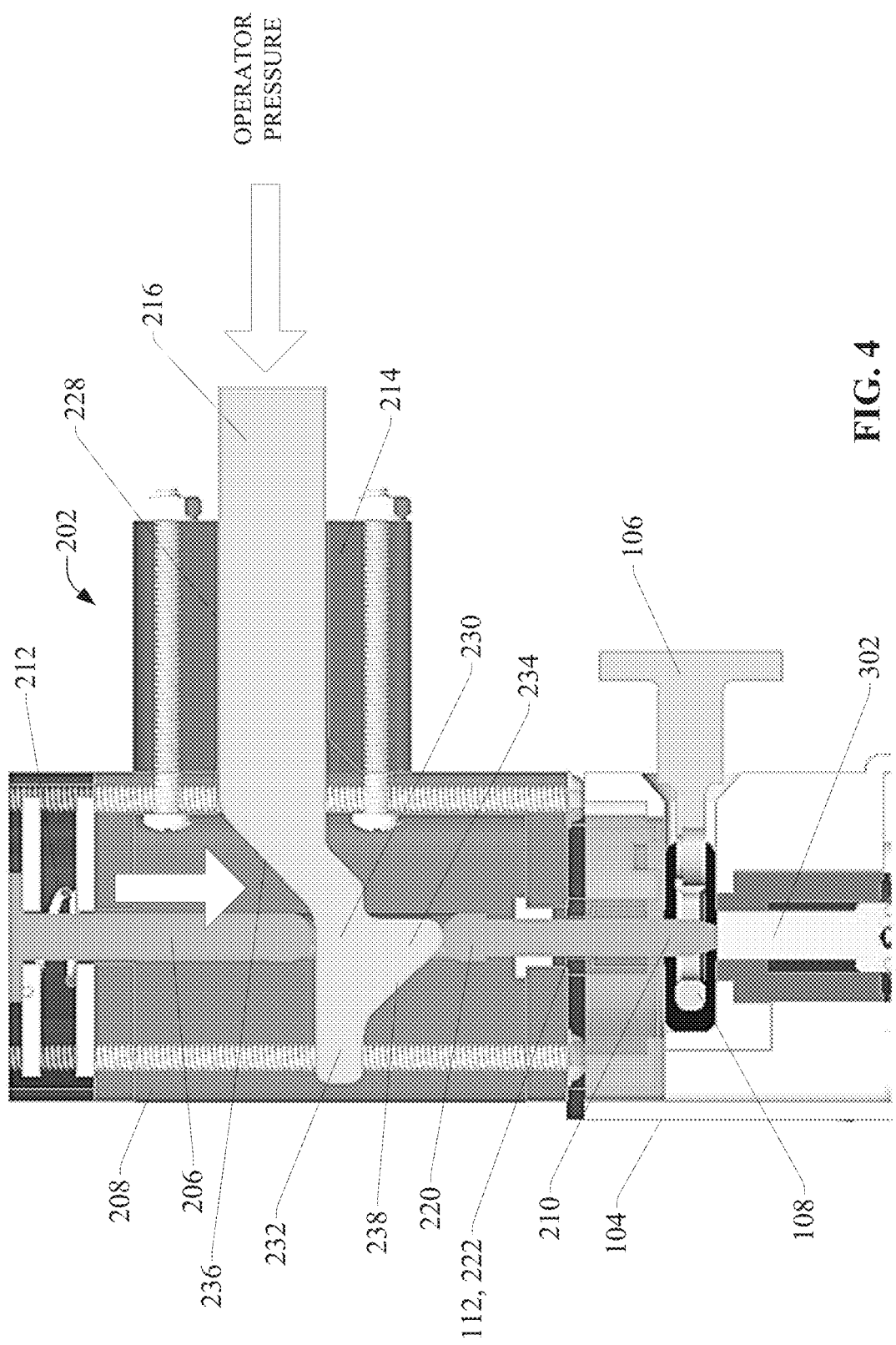
FIG. 4 is a cross-sectional side view of an escape release mechanism mounted to a locking switch as the escape release key is pushed forward into the key bearing.

FIG. 4 is a cross-sectional side view of the escape release mechanism 202 mounted to locking switch 104 as the escape release key 216 is pushed forward into the key bearing 214. As the escape release key 216 travels forward through the key bearing 214 in the direction of plunger 206 (that is, in the direction toward the plunger housing 208), the bottom portion of the plunger's interactive feature 220 is acted upon by the lower sloped section 238 of the front section 230 of the key 216, pushing the plunger 206 downward and causing the pin 210 to act upon the solenoid driven locking bolt 302. In general, interactive feature 220 (e.g., a square or rectangular ring or another type of feature capable of being acted upon by the key's profiled end feature) is configured to be acted upon by the key's profiled front section 230 as the key 216 is moved forward into the plunger housing 208 to thereby move the plunger in a linear direction orthogonal to the direction of the key's linear motion. Thus, as the key 216 is advanced, the operator's pressure on the knob 218 is translated into downward pressure on the solenoid-driven locking bolt 302, applied by pin 210. Spring 212 provides resistance during this first stage of the escape release action. When the key 216 reaches an intermediate position at which the bottom of the interactive feature 220 is in contact with the lower protrusion 234 of the key 216, as depicted in FIG. 4, the pin 210 is sufficiently advanced into the locking bolt shaft to cause the locking bolt 302 to be clear of the locking tongue 108. This intermediate position of the key 216 corresponds to the maximum extended displacement of pin 210.

At this point, the pin 210 itself must be retracted out of the path of locking tongue 108 so that the tongue assembly 106 can be removed, allowing the gate to open. This is achieved by continuing to press forward on knob 218 so that the lower protrusion 234 of the key 216 passes completely through the plunger's interactive feature 220. Once the lower protrusion 234 is clear of the interactive feature 220, the upward force applied to the plunger 206 by spring 212 will cause the plunger 206 (and pin 210) to retract toward the plunger housing 208. To ensure that the plunger 206 fully retracts even if spring 212 fails or breaks (or if the spring's load is insufficient to overcome a shear load on the pin 210), the upper sloped section 236 of key 216 acts upon the top of the plunger's interactive feature 220, forcing the plunger 206 upward and causing the pin 210 to retract toward the plunger housing 208. Thus, as the key 216 is advanced into the plunger housing 208 by the operator's application of force on knob 218, the interaction between the front section 230 of the key 216 and the plunger 206 executes a two-stage escape release action whereby the pin 210 is advance during a first stage (between the home position and the intermediate position of the key 216) and retracted during a second stage (between the intermediate position and an end position of the key 216). The key bearing supports and guides the escape release key 216 through its linear motion as the key is advanced into the plunger housing 204.

FIGS. 5A-5C are cross-sectional side view of escape release mechanism 202 illustrating the three main pin positions that are achieved as the escape release key 216 is advanced into the plunger housing 208. FIG. 5A illustrates the home position as described above in connection with FIG. 3. While in this home position, the tip of pin 210 is at a distance Y1 from the bottom of the plunger housing. FIG. 5B illustrates the state of the escape release mechanism 202 at the intermediate position wherein the lower protrusion 234 of the front section 230 of the escape release key 216 is in contact with the bottom of the plunger's interactive feature 220. In this position, the tip of pin 210 is advanced to its maximum extended distance Y2 from the bottom of the plunger housing 208. Position Y2 represents the maximum displacement of the pin 210 (and plunger 206) and is sufficient to push the solenoid-driven locking bolt 302 of the locking switch out of the path of the locking tongue 108. FIG. 5C illustrates the state of the escape release mechanism 202 when the escape release key 216 is fully pressed into the plunger housing 208 (the end position of the key 216). During the transition from the intermediate position illustrated in FIG. 5B (corresponding to maximum displacement of pin 210) and the fully pressed position illustrated in FIG. 5C, the upper sloped section 236 of the key 216 presses against the top of the plunger's interactive feature 220, causing the pin 210 to retract from position Y2 to position Y3. This retraction is assisted by the upward force applied to the plunger 206 by spring 212. When the key 216 is fully advanced, the top of interactive feature 220 rests on the top surface of the main body of the key 216, holding the pin 210 such that the tip of the pin is at a distance Y3 from the bottom of the plunger housing 208.

In general, the profile of the front section 230 of the escape release key 216 interacts with the interactive feature 220 formed in the plunger 206 to cause the plunger 206 and its pin 210 to translate through the three positions depicted in FIGS. 5A-5C as the key 216 is pushed forward, causing an advancement and a subsequent retraction of pin 210 in response to a single-direction, linear force applied by the operator. In this way, the pin 210 is both advanced and retracted without requiring the operator to perform a two-stage operation (e.g., a push operation and a pull operation) to advance and retract the pin.

In some embodiments, the profile of the key 216 can be designed such that position Y3 is an intermediate position between home position Y1 and fully extended position Y2 (that is, Y2>Y3>Y1). This intermediate position Y3 can prevent the locking switch 104 from re-locking until the escape release mechanism 202 is manually reset, since the solenoid-driven locking bolt 302 will be prevented from fully extending.

The escape release mechanism 202 can be reset to the home position as follows. Knob 218 is pulled away from the key bearing 214 by the operator, causing key 216 to retract from the plunger housing 208 until the key's lower protrusion 234 is stopped by the bottom of the plunger's interactive feature 220. The operator can then press downward on the plunger 206 (e.g., by pressing down on the exposed top end 242 of the plunger that protrudes through the top of the spring housing 204) to allow the lower protrusion 234 to be pulled through the interactive feature 220. The knob 218 can then continue to be pulled until the lower protrusion 234 is stopped by the inside surface of the plunger housing 208 below the key bearing 214, thereby reaching the home position illustrated in FIGS. 3 and 5A.

In some embodiments, either the escape release mechanism 202 can be configured such that pressing the key 216 forward into the plunger housing 208 initiates a stop command on the protected machine or automation system. In other embodiments, the escape release mechanism 202 can act as a safety input device on a safety circuit associated with the protected cell, such that actuating the escape release mechanism 202 causes power on the protected machine or automation system to be isolated. In such embodiments, the escape release mechanism 202 can include safety input and safety output terminals that allow the escape release mechanism 202 to be added to an industrial safety circuit, serving as a safety input device on the circuit.

Embodiments of the escape release mechanism 202 described herein can provide a reliable means for mechanically overriding a solenoid-driven locking switch that can be actuated easily from inside a protected work cell by a single-direction pushing action by the operator. The escape release mechanism 202 acts directly on the locking switch's locking bolt, fulfilling safety standard requirements set forth by the International Organization of Standardization (ISO).

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques.

What is claimed is:

1. An escape release device, comprising:
   a plunger housed in a plunger housing, wherein a first end of the plunger comprises a pin that protrudes through a hole in a first side of the plunger housing, and a section of the plunger comprises an interactive feature;
   an escape release key housed within and guided by a key bearing attached to the plunger housing, wherein the key bearing comprises a key shaft that guides a linear motion of the escape release key, and wherein the key bearing positions the escape release key orthogonally to a length of the plunger,
   wherein a first end of the escape release key comprises a profiled end feature that resides within the plunger housing, and in response to a linear movement of the escape release key into the plunger housing, the profiled end feature interacts with the interactive feature to move the pin in a first direction orthogonal to a direction of the linear movement of the escape release key followed by a second direction opposite the first direction.

2. The escape release device of claim 1, further comprising a spring that resides in a spring housing attached to the plunger housing, wherein the spring applies a force on the plunger in the second direction.

3. The escape release device of claim 2, wherein movement of the pin in the first direction causes the pin to extend from the plunger housing via the hole.

4. The escape release device of claim 1, wherein movement of the pin in the first direction causes the pin to displace a locking bolt of a locking switch on which the escape release device is mounted.

5. The escape release device of claim 3, wherein a tip of the pin reaches a maximum displacement in the first direction when the escape release key is at an intermediate position of the linear movement at which a lower protrusion on the profiled end section is in contact with the interactive feature.

6. The escape release device of claim 5, wherein in response to continuing the linear movement of the escape release key beyond the intermediate position, the force applied to the plunger by the spring moves the pin in the second direction.

7. The escape release device of claim 5, wherein in response to continuing the linear movement of the escape release key beyond the intermediate position, a sloped section on the escape release key acts upon the interactive feature to move the pin in the second direction.

8. The escape release device of claim 7, wherein
the tip of the pin is in a home position at a beginning of the linear movement of the escape release key, and
while the escape release key is at an end of the linear movement, the tip of the pin is retracted to a position between the maximum displacement in the first direction and the home position.

9. The escape release device of claim 5, wherein
the profiled end section comprises a front protrusion configured to reside within the interactive feature of the plunger while the escape release key is withdrawn to a position in which the lower protrusion abuts against an interior surface of the plunger housing, and
the front protrusion acts upon the interactive feature to arrest movement of the plunger in the second direction due to the force applied by the spring.

10. The escape release device of claim 1, wherein the interactive feature is a rectangular ring or a square ring.

11. The escape release device of claim 1, further comprising a knob attached to an end of the escape release key opposite the profiled end feature.

12. An assembly for overriding a solenoid-driven lock, comprising:
an escape release key comprising a profiled end feature, wherein the escape key resides within a key bearing that guides a movement of the escape release key along a first linear path; and
a plunger that resides in a plunger housing that guides a movement of the plunger along a second linear path that is substantially orthogonal to the first linear path, the plunger comprising a first end that protrudes through a hole in an end of the plunger housing, and
an interactive feature located between the first end and a second end of the plunger opposite the first end, wherein
in response to traversal of the escape release key along the first linear path in a direction toward the plunger housing, the profiled end feature interacts with the interactive feature to cause the plunger to move in a first direction along the second linear path until reaching a maximum displacement and to move in a second direction opposite the first direction after reaching the maximum displacement.

13. The assembly of claim 12, wherein
the movement of the plunger in the first direction causes the first end of the plunger to extend from the hole until the maximum displacement is reached, and
movement of the plunger in the second direction causes the first end of the plunger to retract toward the plunger housing.

14. The assembly of claim 13, wherein
the second linear path is coaxial with a locking bolt of a locking switch, and
movement of the plunger in the first direction causes the first end of the plunger to displace the locking bolt.

15. The assembly of claim 12, further comprising a spring that applies a force on the plunger in the second direction.

16. The assembly of claim 12, wherein
the profiled end feature comprises a lower protrusion, and
the maximum displacement is reached when the escape release key is at an intermediate position along the first linear path that causes the lower protrusion to be in contact with the interactive feature.

17. The assembly of claim 16, wherein in response to continued traversal of the escape release key along the first linear path in the direction toward the plunger housing beyond the intermediate position, a force applied to the plunger by a spring causes the plunger to move in the second direction.

18. The key assembly of claim 16, wherein
the escape release key further comprises a sloped section, and
in response to continued traversal of the escape release key along the first linear path in the direction toward the plunger housing beyond the intermediate position, the sloped section interacts with the interactive feature to move the plunger in the second direction.

19. An escape release mechanism, comprising:
a plunger housing;
a key bearing attached to the plunger housing, the key bearing comprising a key shaft that guides a linear motion of an escape release key; and
a plunger housed within the plunger housing and arranged orthogonally to the key shaft, the plunger comprising an interactive feature formed between a first end and a second end of the plunger and a pin formed on the first end of a plunger, wherein the pin protrudes through a hole in a first side of the plunger housing and is configured to,
in response to movement, via the key bearing, of the escape release key from a home position to an intermediate position in a direction toward the plunger housing along a first linear path through the interactive feature, extend from the plunger housing along a second linear path that is substantially orthogonal to the first linear path, and in response to movement of the escape release key from the intermediate position to an end position in the direction toward the plunger housing along the first linear path, retract toward the plunger housing along the second linear path.

20. The escape release mechanism of claim 19, wherein movement of the pin along the second linear path is caused by interaction between a profiled end feature of the escape release key and the interactive feature on the plunger.

* * * * *